United States Patent [19] [11] Patent Number: 4,628,738
Burckhardt et al. [45] Date of Patent: Dec. 16, 1986

[54] ULTRASONIC IMAGING DEVICE

[75] Inventors: Christoph B. Burckhardt, Muttenz; Rainer Fehr, Reinach; Peter Krummenacher, Gipf-Oberfrick, all of Switzerland

[73] Assignee: Hoffmann-La Roche Inc., Nutley, N.J.

[21] Appl. No.: 830,601

[22] Filed: Feb. 19, 1986

Related U.S. Application Data

[63] Continuation of Ser. No. 695,768, Jan. 28, 1985, abandoned.

[30] Foreign Application Priority Data

Jan. 30, 1984 [CH] Switzerland ............... 416/84

[51] Int. Cl.⁴ .................................... G01N 29/00
[52] U.S. Cl. ................................. 73/626; 367/105; 128/660
[58] Field of Search ............ 73/625, 626; 367/105; 128/660

[56] References Cited

U.S. PATENT DOCUMENTS 4,224,829 9/1980 Kawabuchi et al. .................. 73/626
4,319,489 3/1982 Yamaguchi et al. .................. 73/626
4,328,707 5/1982 Clement et al. ....................... 73/626
4,372,323 2/1983 Takemura et al. .................... 73/625
4,442,713 4/1984 Wilson et al. ......................... 73/626
4,505,156 3/1985 Questo .................................. 73/626

Primary Examiner—Howard A. Birmiel
Attorney, Agent, or Firm—Jon S. Saxe; Bernard S. Leon; Richard J. Mazza

[57] ABSTRACT

An ultrasonic imaging apparatus for operation in either or both linear and sector scan modes is disclosed which employs a common array of transducers. Circuitry is provided for controlling the order and timing of pulse echo transmission and reception, which further include control circuitry to operate variable delay and switching circuitry to generate transmission signals to be applied to the transducers, and to direct echo signals received by the transducers for processing to provide the image of the structures being inspected. Suitable interconnection/switching circuitry is provided so as to minimize prior art requirements for use of different elements for the separate scanning modes, with concomitant expenses associated with the larger number of components being reduced.

7 Claims, 8 Drawing Figures

ULTRASONIC IMAGING DEVICE

This is a continuation of application Ser. No. 695,768 filed Jan. 28, 1985, now abandoned.

FIELD OF THE INVENTION

The invention relates to a transmitter/receiver device for an ultrasonic imaging unit for producing cross-sectional images of a body, the said unit operating by the pulse echo method and comprising the following means: an array of transducer elements which are disposed side by side and which in response to transmission signals fed to the transducer elements directs ultrasonic pulses into the body along a plurality of beams, receives echoes of these pulses reflected by irregularities of the acoustical resistance within the body, and generates electrical echo signals in response to the received echoes, and first electrical connecting means for transmitting the transmission and the echo signals between the transducer elements and electrical connections in the transmitter/receiver device, said connecting means either being in the form of permanent connections or connections which are adapted to be established in response to first control signals.

BACKGROUND OF THE INVENTION

Ultrasonic imaging units containing a transmitter/receiver device of the above kind are known (German Offenlegungschrift No. 26 54 280, European Patent Application having the publication No. 0 006 197). The transmitter/receiver device provided in the known units, however, usually allows only one specific scanning process, e.g. a linear scan or a sector scan. However, for medical examinations in particular it is often advantageous to perform different scanning processes, and in fact such different scanning processes may be necessary to establish a diagnosis. Since the price of ultrasonic imaging units is relatively expensive, it is desirable to provide a transmitter/receiver device enabling different scanning processes, more particularly a sector scan and a compound scan, to be carried out with one and the same ultrasonic imaging unit. In order to generate high-quality images, this system should also comprise means for focusing the transmitted ultrasonic waves and, preferably, means for dynamic focusing of the reception characteristic. If the attempt were made to construct an apparatus of this kind simply by connecting together the means known in the art for performing the different scanning processes, and the electronic processing circuits used in such cases for the transmission signals and the echo signals, the size and the complexity of the circuitry required would be considerable. This would have two serious disadvantages: (a) the production costs of the apparatus would be drastically increased and (b) the large number of series-connected electronic components would have a very adverse effect on the signal-noise ratio and the image quality would be impaired correspondingly.

The object of the invention, therefore, is to provide a transmitter/receiver device of the kind indicated hereinbefore whereby with little expenditure it is possible to carry out different scanning processes, more particularly compound scan and sector scan, using substantially the same ultrasonic display unit, while producing high-quality ultrasonic images.

SUMMARY OF THE INVENTION

To this end, the invention provides an improved transmitter/receiver device of the type comprising:

an array of transducer elements which are disposed side by side and which in response to transmission signals fed to the transducer elements directs ultrasonic pulses into the body along a plurality of beams, receives echoes of these pulses reflected by irregularities of the acoustical resistance within the body, and generates electrical echo signals in response to the received echoes and first electrical connecting means for transmitting the transmission and the echo signals between the transducer elements and electrical connections in the transmitter/receiver device, said connecting means either being in the form of permanent connections or connections which are adapted to be established in response to first control signals, wherein the improvement comprises the further provision of:

a transmission signal generator which, in response to second control signals, delivers, by way of a plurality of outputs, groups of selected transmission signals having predetermined positions in time, each transmission signal of a group being delivered via a respective output of said generator, an echo signal processing circuit having a plurality of inputs and containing first variable delay means by means of which the echo signals reaching the inputs of the echo signal processing circuit can be selectively delayed in response to third control signals, an array of lines each line connecting one output of the transmission signal generator to a respective input of the echo signal processing circuit, signal transmission means inserted between the array of lines and the first electrical connecting means, said signal transmission means containing second variable delay means by means of which the transmission signals and the echo signals can be selectively delayed in response to fourth control signals and second electrical connecting means by means of which the transmission signal generator, the first and the second delay means and, as required, the first electrical connecting means are adapted to be connected to a control circuit delivering the second, third, fourth and, if required, the first control signals.

By means of the transmitter/receiver device according to the invention it is possible with little outlay to carry out different scanning processes, more particularly a compound scan or a sector scan, and even a linear scan, using substantially one and the same ultrasonic imaging unit (depending on the scanning process selected all that is required is to equip the unit with a transducer array suitable for the purpose), while producing high quality ultrasonic images.

Other advantages and features of the present invention will be apparent from the following description of one exemplified embodiment with reference to the accompanying drawings wherein.

Figure 2:
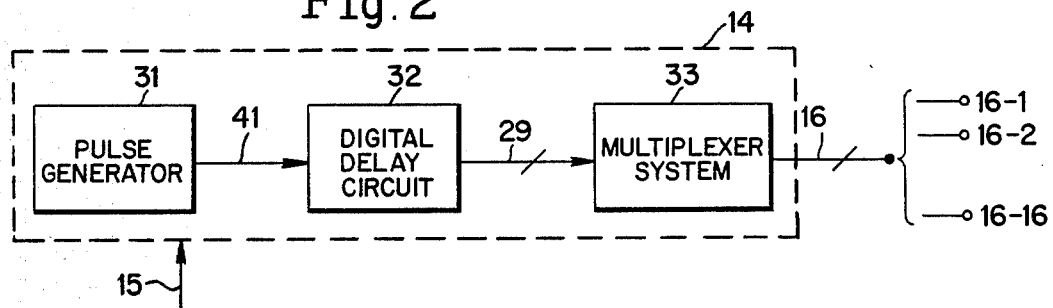
FIG. 2 is a schematic block diagram of the transmission signal generator 14 in FIG. 1.
Figure 4:
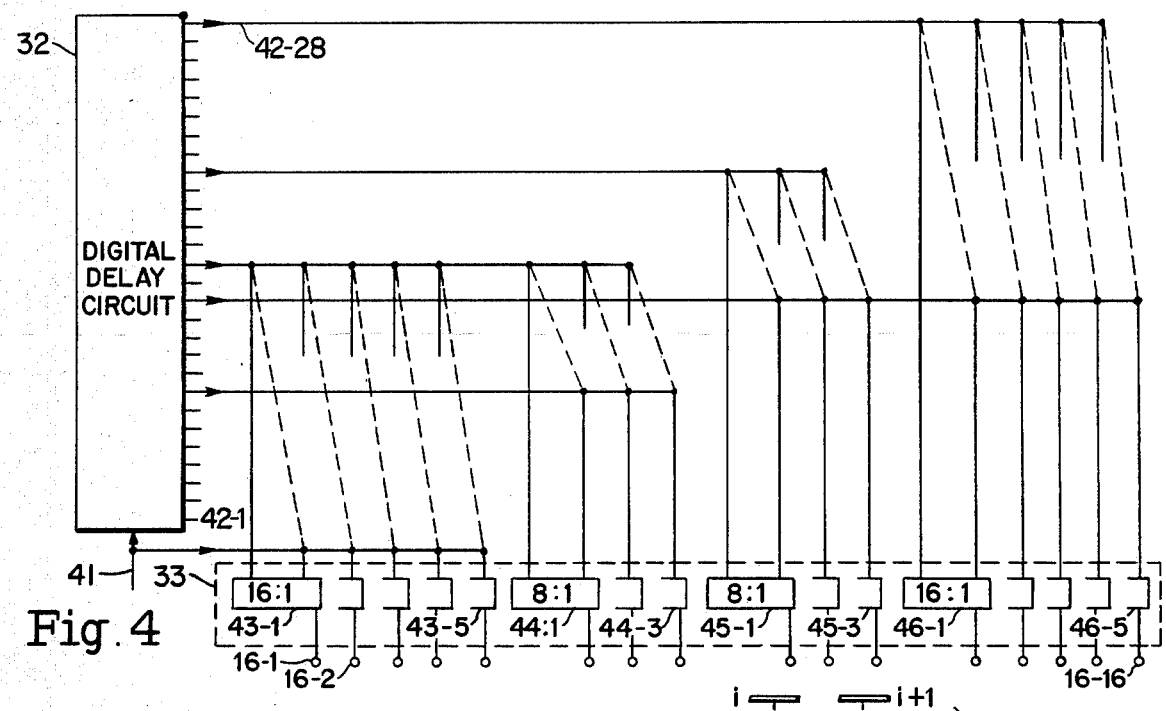

FIG. 4 diagrammatically illustrates one preferred embodiment of the blocks 32 and 33 in FIG. 2.

Figure 1:
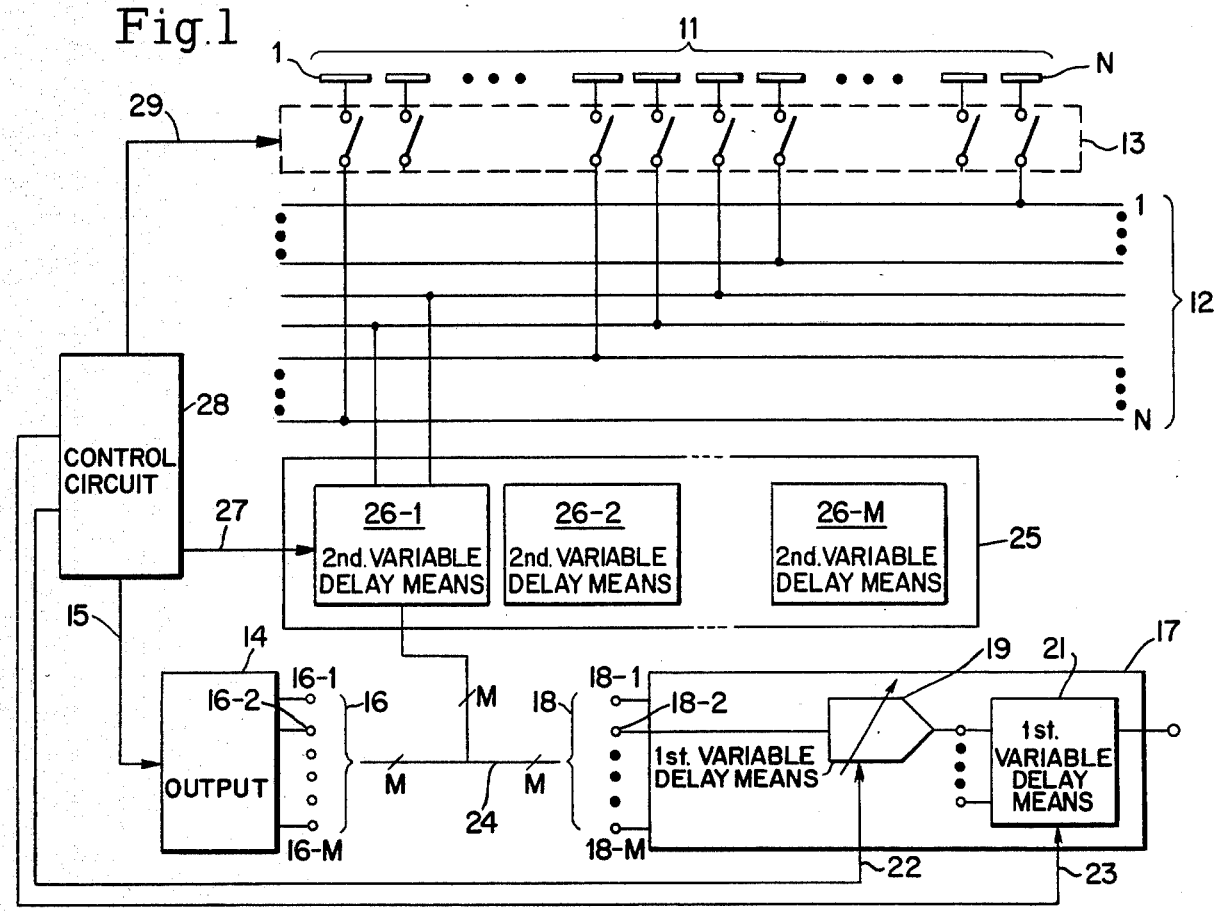
FIG. 1 is a schematic block diagram to explain the principle of the device according to the invention.
Figure 5:
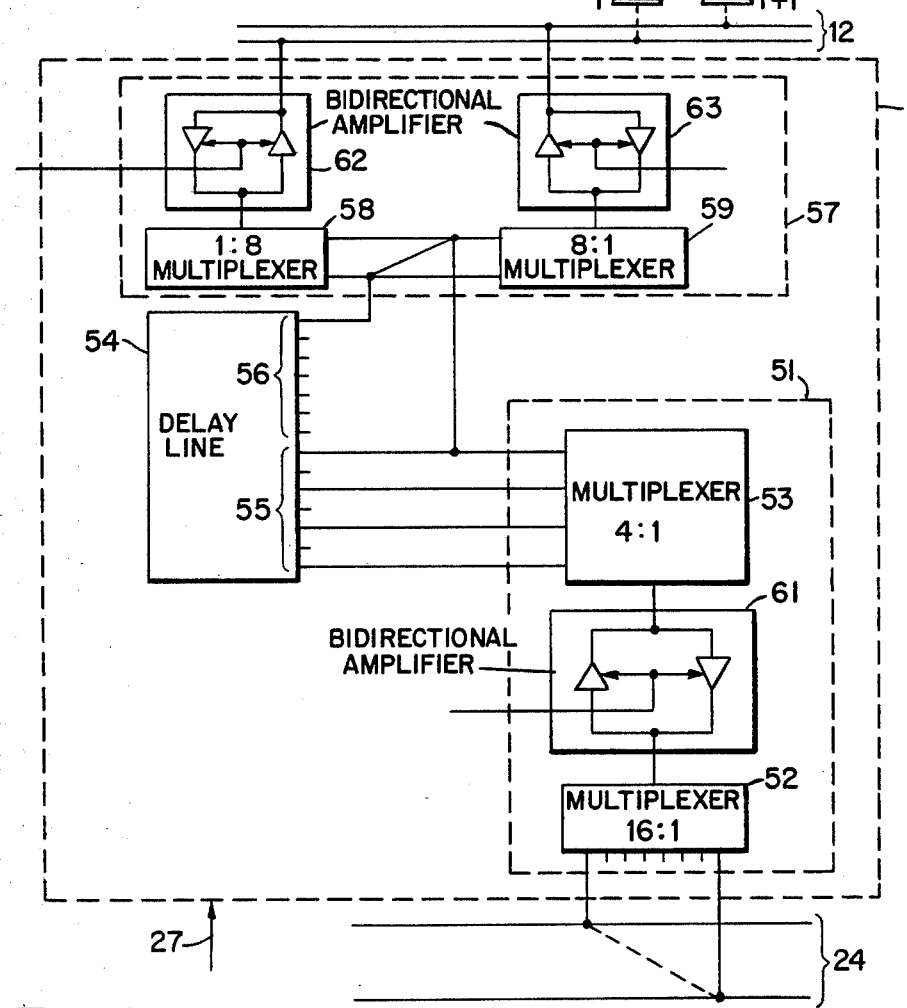

FIG. 5 is a schematic block diagram of the delay means 26-1 in FIG. 1.

Figure 6:
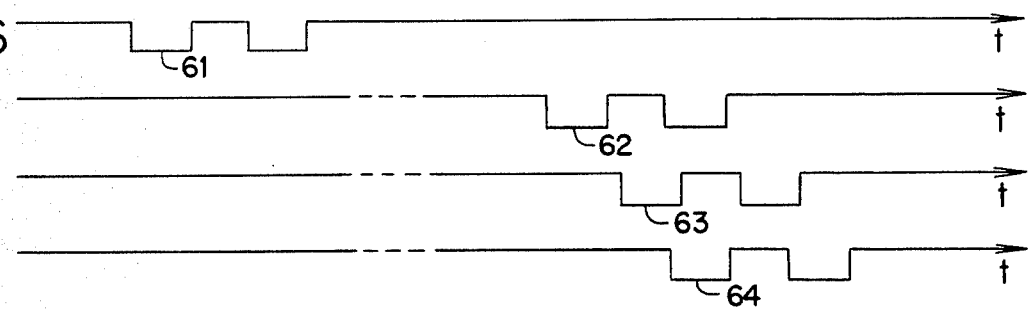

FIG. 6 shows some signal configurations for explaining the method of generating the transmission signals.

Figure 7:
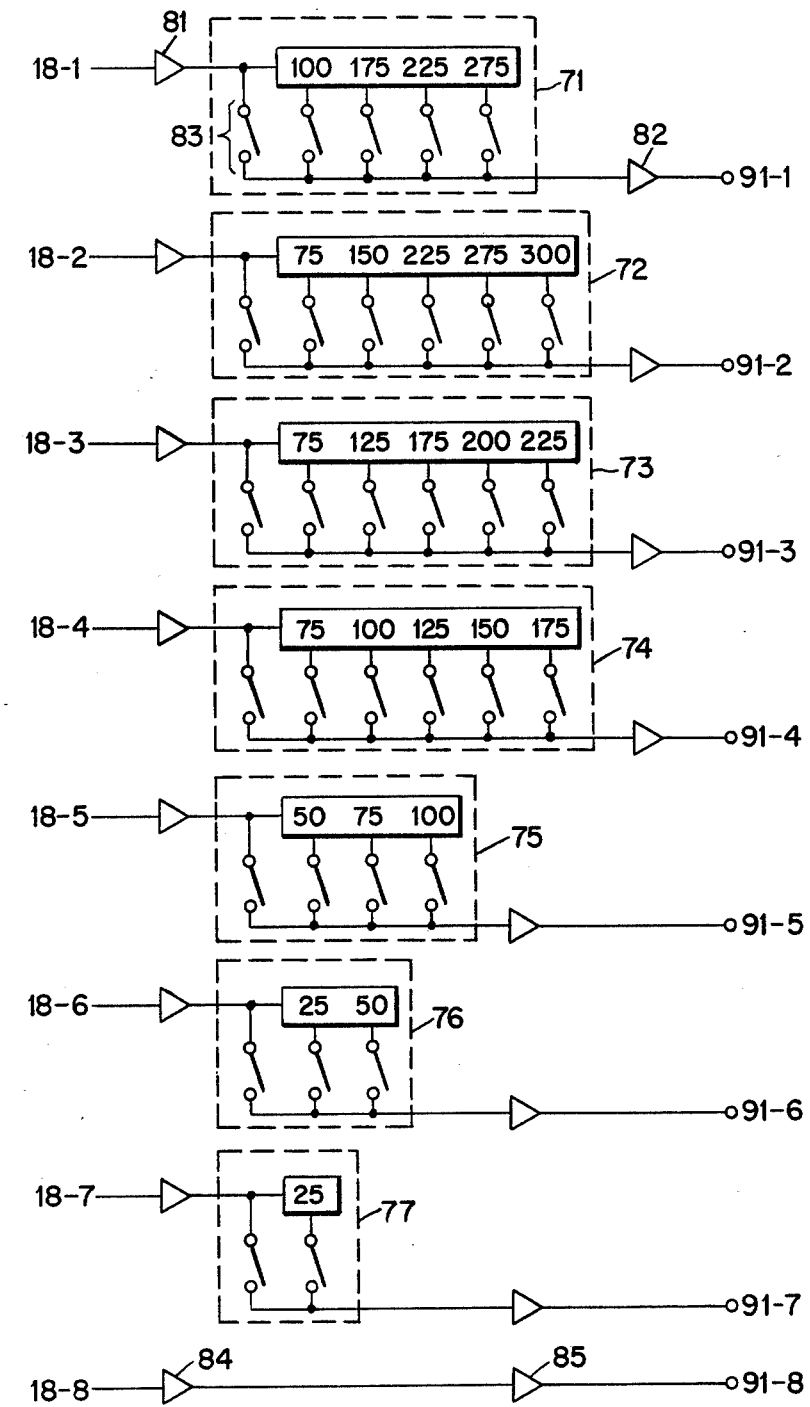

FIG. 7 is a diagram of one preferred embodiment of the block 19 in FIG. 1 represents means for dynamic focusing of the reception characteristic.

Figure 8:
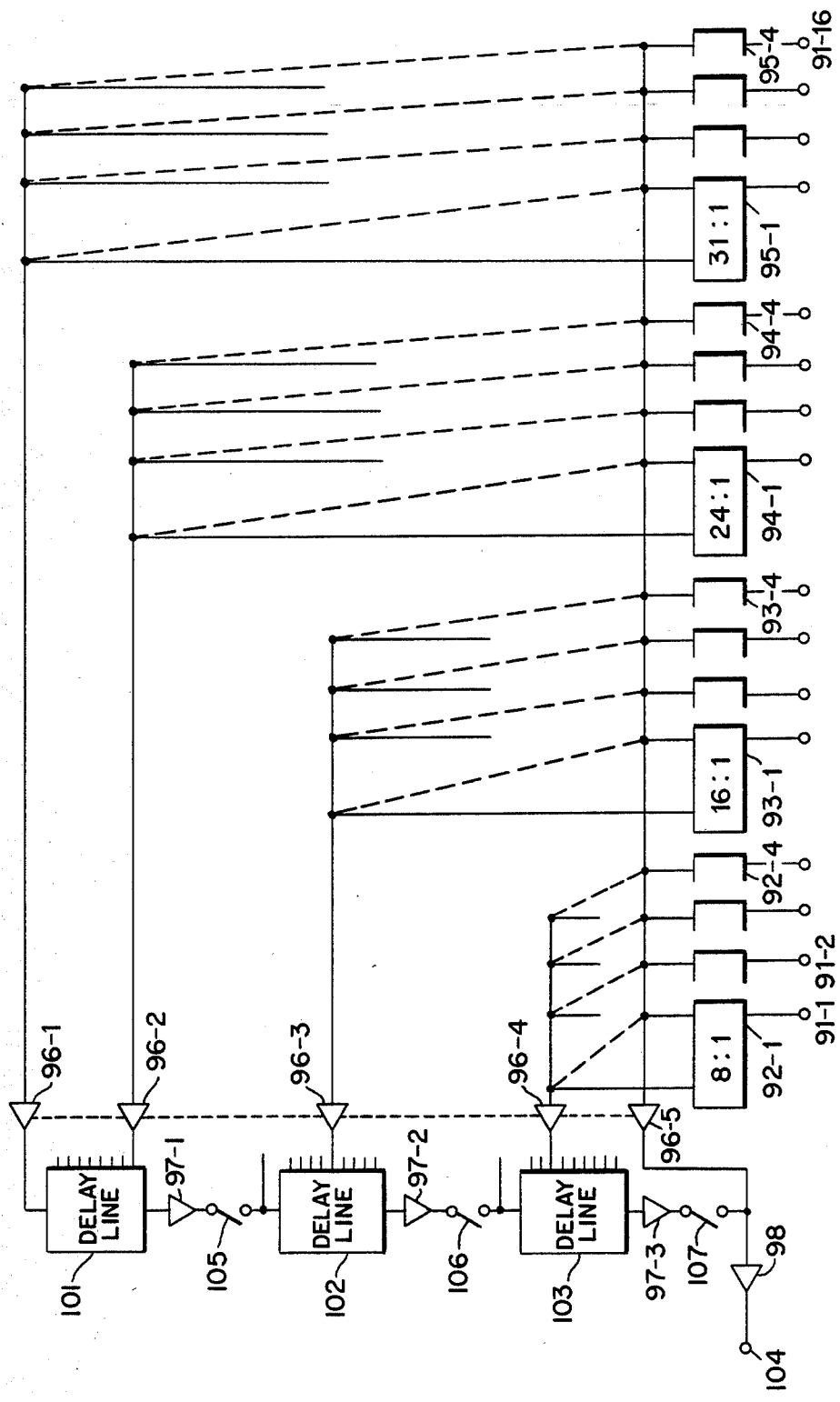

FIG. 8 diagrammatically illustrates one preferred embodiment of block 21 in FIG. 1.

DETAILED DESCRIPTION OF THE INVENTION

FIG. 1 is a block schematic of a transmitter/receiver device according to the invention, and its connections to a group of transducer elements 11 of an ultrasonic imaging unit and to a control circuit 28.

The unit operates on the pulse echo principle in order to produce cross-sectional pictures of a body. An array of adjacent transducer elements is used for this purpose and is applied to the body. A rectilinear transducer element array is usually used, but it is possible to use a curved array provided that this is taken into account in the transmitter/receiver device design.

To carry out a sector scan, all the transducer array elements are simultaneously connected to the transmitter/receiver device. To carry out a linear scan or a compound scan, however, groups of adjacent transducer elements are connected successively to the transmitter/receiver device.

For a sector scan, the transducer array 11 in FIG. 1 represents the totality of all the elements 1-N of the array used for the puprpose. In this case each transducer element is usually permanently connected to one of the lines of an array of N bus lines 12. This array is called bus 12 hereinafter.

For a linear scan or a compound scan the transducer array 11 in FIG. 1 represents one of the successively used groups of N-transducer elements. In this case each element of the group of transducer elements 11 is connected via a switch of an array 13 to one of the lines of the bus 12. The switch array 13 is controlled by first control signals fed to it by control circuit 28 via line 29.

As shown in FIG. 1, the transmitter/receiver device according to the invention comprises a transmission signal generator 14, and echo signal processing circuit 17, an array of M bus lines 24 and signal transmission means 25. The array of bus lines 24 is called bus 24 hereinafter.

In response to second control signals fed to it from control circuit 28 via line 15, the transmission signal generator 14 delivers groups of selected transmission signals having predetermined positions in time, said signals being delivered via a plurality of outputs 16, each transmission signal of a group being delivered via a respective output in each case.

The echo signal processing circuit 17 has a plurality of inputs 18 and contains first variable delay means 19 and 21 by means of which the echo signals reaching the inputs 18 can be selectively delayed in response to third control signals delivered by the control circuit 28 via lines 22 and 23 respectively. FIG. 1 shows the delay means 19 only for one of the inputs of the echo signal processing circuit, but delay means of this kind are provided for most of the other inputs as well. The block 21 in FIG. 1, on the other hand, represents delay means by means of which selective roughly quantized delays of all the echo signals reaching the inputs of the echo signal processing circuit 17 can be carried out.

The bus 24 connects each output of the transmission signal generator 14 to an input of the echo signal processing circuit 17.

The signal transmission means 25 are disposed between the bus 24 and the bus 12 and serve to transmit the transmission signals and the echo signals. The means 25 comprises second variable delay means 26-1, 26-2 to 26-M, by means of which, in response to fourth control signals delivered by the control circuit via line 27, it is possible to carry out selective finely quantized delay of the transmission signals and of the echo signals. FIG. 1 shows only the electrical connections of block 26-1. The other blocks 26-2 to 26-M have similar connections not shown in FIG. 1. As illustrated diagrammatically in FIG. 1, each of the blocks 26-1, 26-2, etc. is connected (a) to at least two lines of the bus 12 and (b) to all the lines of the bus 24.

To perform a sector scan with a rectilinear transducer array, ultrasonic pulses are of course transmitted successively in a plurality of different directions and the echo signals received are processed and then displayed on a display unit. To perform a compound scan with a rectilinear transducer array the method is similar but is carried out, not with a single group of transducer elements, but with different transducer groups which are used successively for transmission and for reception. A process of this kind is described in the U.S. Pat. Spec. No. 4,070,905.

When ultrasonic waves are transmitted with a group of adjacent transducer elements, the direction of the ultrasonic beam transmitted in each case is determined by the relative position in time of the transmission signals fed to the transducer elements. To transmit ultrasonic waves in a given direction, therefore, transmission signals having different delays with respect to a reference signal are fed to the transducer elements, the delay associated with each transmission signal being determined according to the required transmission direction and the relative position of the transducer element in the array. Similar processing of the echo signal is required to detect appropriately the image information carried by the echo waves. These signals are delayed at different times for this purpose, the specific delay associated with each echo signal being determined in dependence on the reception direction and the relative position of the transducer element in the array. The echo signals with their different delays are then added and transmitted to the display unit.

As described hereinafter in detail, the transmitter/receiver device according to the invention as shown in FIG. 1 comprises means whereby the transmission and echo signals can be delayed as indicated above.

In a preferred embodiment which provides improved quality of the ultrasonic images, the transmitter/receiver device according to FIG. 1 has the following additional delay means:

(a) means which make possible additional delay of the transmission signals and hence focusing of the transmitted ultrasonic beam, (b) means which make possible additional echo signal delays which are variable with time, thus allowing dynamic focusing of the reception characteristic.

The overall delay of a typical transmission signal fed to one of the transducer elements shown in FIG. 1 consists of a roughly quantized delay increment carried out in the transmission signal generator 14 and a finely quantized delay increment carried out in the signal transmission means 25.

The overall delay of a typical echo signal delivered by a transducer element and processed in the transmitter/receiver device shown in FIG. 1 also consists of a finely quantized delay increment, which is carried out partly in the signal transmission means 25 and partly in the delay means 19, and a roughly quantized delay increment carried out in the delay means 21.

The above description of the principle and operation of the transmitter/receiver device according to the invention shows that its following features make possible a considerable reduction in circuitry:

(a) signal transmission means 25 by means of which both the transmission signals and the echo signals are transmitted, and in which part of the total delay of each transmission signal and echo signal is carried out, (b) at least two transducer elements are connected to each of the delay means 26-1, 26-2, etc.

A preferred embodiment of the circuit shown in FIG. 1 will now be described with reference to the accompanying drawings.

The transducer group 11 consists of 32 transducer elements and each of these elements can be connected to a respective line of the bus 12 by means of a respective switch of the array 13. The bus 12 thus consists of 32 lines.

The bus 24 consists of 16 lines. Each of these lines connects one output of the transmission signal generator 14 to one input of the echo signal processing circuit 17.

Figure 3:
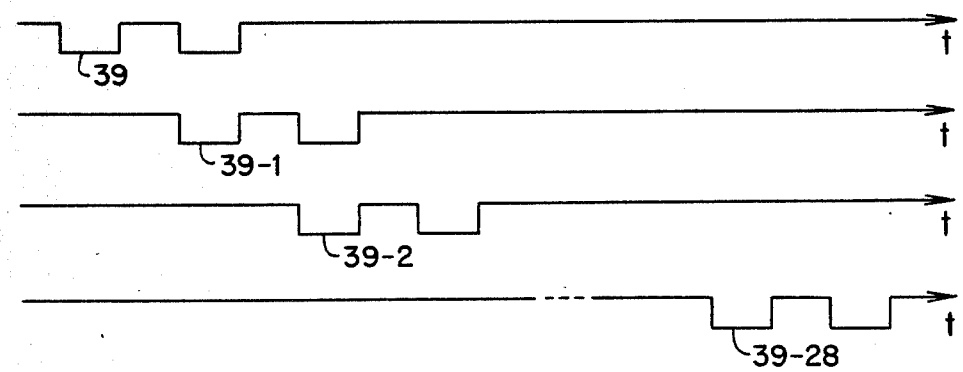
FIG. 3 shows some of the pulses at the outputs of the delay line 32 in FIG. 2.

FIG. 2 is a block diagram of the transmission signal generator 14 shown in FIG. 1. It comprises a pulse generator 31, a digital delay circuit 32, e.g. a shift register, and a multiplexer system 33. In response to a clock pulse the pulse generator 31 delivers a first pulse 39 at its output. FIG. 3 shows a pulse of this kind. When a pulse 39 reaches the input of delay circuit 32 via a line 41, pulses 39-1, 39-2, 39-28 are delivered at its 28 outputs 42-1 to 42-8 (see FIG. 4) and have different roughly quantized delays relative to the first pulse 39. These pulses are also shown in FIG. 3. The interval of time between successive pulses at the outputs of the delay circuit 32 is 200 nsec. The undelayed pulse 39 is delivered at another output of the delay circuit 32. In response to second control signals fed to it via lines 15 the multiplexer system 33 selectively connects 16 outputs of the delay circuit 32 to the outputs 16-1, 16-2, to 16-16 of the transmission signal generator, and hence to the 16 lines of the bus 24. FIG. 4 diagrammatically shows the structure of the multiplexer system 33 and its connections. As will be seen in the drawing, system 33 comprises an array of digital multiplexers 43-1 to 43-5, 44-1 to 44-3, 45-1 to 45-3 and 46-1 to 46-5. System 33 is connected (a) to the input of the delay circuit 32 and its tappings 42-1 to 42-28 and (b) to the outputs 16-1 to 16-16 of the transmission signal generator. The control signals which control the function of the multiplexer array 33 are fed to it via lines 15 which in FIG. 2 are illustrated diagrammatically in the form of a single line. The multiplex ratios of the multiplexers shown in FIG. 4 are indicated there for each sub-group of multiplexers in one of the blocks.

FIG. 5 is a block diagram of the delay means 26-1 in FIG. 1. According to FIG. 1, means of this kind can be connected between at least each pair of transducer elements and all the lines of the bus 24. As shown in FIG. 5, the delay means 26-1 contain a delay line 54, e.g. a LC delay line having a first and a second group of tappings 55 and 56, a first multiplexer system 51 by means of which each line of the bus array 24 can be selectively connected to one tapping of the first group of tappings 55 of the delay line 54, and a second multiplexer system 57 by means of which each of the at least two transducer elements can be selectively connected to one tapping of the second group of tappings 56 of the delay line 54. The multiplexer system 51 contains a multiplexer 52 connected by suitable connections (a) to the 16 lines of the bus 24 and (b) via a bidirectional amplifier 61 to a multiplexer 53 connected via suitable connections to the group of tappings 55 of the delay line 54. The multiplexer system 57 also contains two multiplexers 58, 59 which are connected by suitable connections to the group of tappings 56 of the delay line 54. Each of the multiplexers 58, 59 is also connected via a bidirectional amplifier 62, 63 respectively to one line of the bus 12. The multiplexers 52, 53, 58, 59 are commercially available analog multiplexers. FIG. 5 indicates the multiplex ratio in the respective block for each of the multiplexers illustrated. Different finely quantized delays of the signals transmitted by the delay line can be introduced by the choice of tappings to which the multiplexers of the multiplexer systems 51, 57 are connected. The tappings of the first group of tappings 55 provide delay increments of 50 nsec, while the tappings of the second group of tappings 56 give delay increments of 25 ns. The control signals for the multiplexer systems 51 and 57 are transmitted via a number of lines indicated diagrammatically in FIG. 5 by line 27. These control signals are delivered by control circuit 28 and stored in registers (not shown in FIG. 5) before each ultrasonic pulse is emitted by the transducer array 11. Control signals both for transmitting the transmission signals and for transmitting the echo signals are stored in these registers. The control signals for transmitting the transmission signals are usually different from those provided for transmission of the echo signals.

FIG. 6 illustrates a number of signal configurations which will serve for explanation of the transmission of a transmission signal by the delay means 26-1. The top part of FIG. 6 shows a pulse 61 which will serve as a reference pulse in order to define the position of the other pulses in time. Pulse 62 in FIG. 6 is a pulse delivered by the transmission signal generator 14 in FIG. 1 via one of the lines of bus 24. The above-mentioned control of the multiplexer systems 51, 57 causes a pulse of this kind to be transmitted through the delay line 54 to a transducer element i. As a result it undergoes a certain delay, e.g. 125 ns. A pulse of this kind is shown as pulse 63 in FIG. 6. Similarly, a pulse 64 is derived from pulse 62 and is fed to a transducer element $i+1$. As will be seen from FIG. 6, a pulse 64 of this kind usually has a delay of, for example, 75 nsec relative to pulse 63. All the transmission pulses are of negative polarity. For this reason the transmission pulses are not processed by the echo signal processing circuit 17.

The multiplexer 52 in FIG. 5 has two important functions. For scanning processes in which the transmitted ultrasonic beam or the reception characteristic must be rotatable in the scanning plane, e.g. for a sector scan or a compound scan, the multiplexer 52 enables the direction of transmission or reception to be rotated to the left or right. Without the multiplexer 52 this would be impossible with the circuit arrangement according to the invention as shown in FIG. 1, because the means for carrying out the rough delay increment of the transmission and echo signals are so disposed therein that a transmitted ultrasonic beam or the corresponding reception characteristic could be deflected only in one direction starting from the vertical, i.e. only to the right or left. The arrangement of delay means referred to hereinbefore enables the circuitry to be reduced. For scanning processes in which different transducer groups are used successively, e.g. for a compound or a linear scan, the multiplexer 52 also enables the transmission paths to be changed over cyclically so that the transmission and echo signals undergo the appropriate delays. This is necessary because cyclic activation of the transducer elements is carried out in the latter processes.

The transmission path for the echo signals extends from each transducer element to one of the lines of the bus 24. The function of the delay means 26-1, 26-2 etc. is similar to that described above for the transmission of the transmission signals. However, the operation of the multiplexers 53, 59, 58 in FIG. 5 usually differs from their operation for the transmission of the transmission signals. In this way the echo signals are fed via lines of the bus 24 to the inputs 18-1, 18-2 to 18-16 of the echo signal processing circuit 17 in FIG. 1. The echo signals are of positive polarity and can therefore be processed by the circuit 17. As stated above, circuit 17 contains means for dynamic focusing of the reception characteristic. In FIG. 1 these means are denoted by a variable delay line 19 for one of the inputs. The means for carrying out the dynamic focusing are illustrated diagrammatically in FIG. 7 for one half of the inputs of the echo signal processing circuit 17. Such means are provided also for the other half of the inputs of circuit 17. As will be seen from FIG. 7, the echo signals fed to the inputs of the echo signal processing circuit 17 can be delayed by variable delay lines 71–77. These comprise commercially available LC delay lines. The delays provided by these lines are varied stepwise during reception by suitable control of the switches 83. This gives the dynamic focusing of the reception characteristic. FIG. 7 shows the available delay in ns for each tapping of the delay lines in blocks 71–77. Each of the delay lines shown in FIG. 7 is connected to an upstream and downstream buffer amplifier 81, 82. No delay line is provided for the input 18-8. The echo signals reaching this input are transmitted by buffer amplifiers 84, 85. The signals at the outputs 91-1 to 91-8 are fed to the inputs of the delay means 21 in FIG. 1.

The transmission path for the echo signals runs on from the 16 outputs of the array, half of which was described above with reference to FIG. 7, to the 16 inputs of the delay means 21 in FIG. 1. FIG. 8 diagrammatically shows the construction of these means. It will be apparent that the echo signals arriving via lines 91-1 to 91-16 can be fed via an array of analog multiplexers 92-1 to 92-4, 93-1 to 93-4, 94-1 to 94-4, 95-1 to 95-4, selectively either to the input of an output amplifier 98 or tappings of delay lines 101, 102, 103 which can be connected in series by switches 105, 106 by a suitable control. These delay lines give a roughly quantized delay increment for the echo signals. This quantization is effected in steps of 200 ns. The multiplexers in FIG. 8 are controlled by control signals fed to them via a number of lines shown diagrammatically as line 23 in FIG. 1. The multiplex ratios of the multiplexers in FIG. 8 are indicated in one of the blocks for each sub-group of multiplexers. To simplify the illustration FIG. 8 does not show all the connections between the multiplexers and the tappings of the delay lines 101 to 103, but only a few thereof. The output 104 of the output amplifier 98 delivers an output signal representing the sum of all the echo signals indicated by the transducer elements 11 in FIG. 1, after processing in the echo signal processing circuit 17. In the arrangement shown in FIG. 8, buffer amplifiers 96-1 to 96-5 and 97-1 to 97-3 are provided. The output of the delay line 103 is connected to the input of output amplifier 98 via a controlled switch 107. The signal at output 104 is processed further in a known manner, i.e. it is amplified with time-variable amplification factor, amplitude-compressed and rectified before being fed to the display means of the ultrasonic imaging unit.

Of course the above-described transmitter/receiver device can be used with different transducer arrays and with different transmission frequencies. The latter are preferably between 2.5 and 5 MHz. A transducer array having a total of 32 transducer elements each having a width of 0.4 mm is suitable, for example, for carrying out a sector scan with a transmission frequency to 2.8 MHz. A transducer array having a total of 156 transducer elements each having a width of 0.6 mm and used in successively selected groups of 32 elements is suitable for carrying out a compound scan at a transmission frequency of 3 MHz.

In alternative forms of the transmitter/receiver device shown in FIG. 1, other ratios may be provided between the number N of elements in the transducer array 11 and the number M of lines in the bus array 24. The ratio in the example described above is $N:M=2:1$.

We claim:

1. An improved transmitter/receiver device for an ultrasonic imaging unit for producing cross-sectional images of a body, said unit operating by the pulse echo method and being of the type comprising:

an array of transducer elements which are disposed side by side and which in response to transmission signals fed to the transducer elements directs ultrasonic pulses into the body along a plurality of beams, receives echoes of these pulses reflected by irregularities of the acoustical resistance within the body, and generates electrical echo signals in response to the received echoes and first electrical connecting means for transmitting the transmission and the echo signals between the transducer elements and electrical connections in the transmitter/receiver device, said connecting means either being in the form of permanent connections or connections which are adapted to be established in response to first control signals, wherein the improvement comprises the further provision of:

(a) a transmission signal generator which, in response to second control signals, delivers, by way of a plurality of outputs, groups of selected transmission signals, said groups having predetermined positions in time, and each transmission signal of a group being delivered via a respective output of said generator, (b) an echo signal processing circuit having a plurality of inputs and containing first variable delay means by means of which the echo signals reaching the inputs of the echo signal processing circuit can be selectively delayed in response to third control signals, (c) an array of lines, each line connecting one output of the transmission signal generator to a respective input of the echo signal processing circuit, (d) signal transmission means inserted between the array of lines and the first electrical connecting means, said signal transmission means containing second variable delay means by means of which the transmission signals and the echo signals can be selectively delayed in response to fourth control signals and (e) second electrical connecting means by means of which the transmission signal generator, the first and the second delay means and, as required, the first elec- trical connecting means are adapted to be connected to a control circuit delivering the second, third, fourth and, if required, the first control signals.

2. A device according to claim 1, wherein the first variable delay means comprises means for dynamic focusing of the transducer array reception characteristic.

3. A device according to claim 1, wherein the number (M) of lines in the array of lines is smaller than the number (N) of transducer elements connected to the device.

4. A device according to claim 1, wherein the signal transmission means for at least each pair of adjacent transducer elements contains the following means:
a delay line having a first and a second group of tappings,
a first multiplexer system by means of which each line in the array of lines can be selectively connected to one tapping of the first group of tappings of the delay line, and
a second multiplexer system by means of which each of the at least two transducer elements can be selectively connected to a tapping of the second group of tappings of the delay line.

5. A device according to claim 1, wherein the transmission signal generator contains:
a pulse generator which delivers a first pulse at its output in response to a clock pulse,
a delay circuit having an input connected to the output of the pulse generator and by means of which it is possible to derive from the first pulse delivered by the pulse generator a plurality of pulses having different delays with respect to the first pulse, each of the pulses thus derived being adapted to be taken from one of a plurality of outputs of the delay circuit, and
a multiplexer system by means of which some of the outputs of the delay circuit can be selectively connected to the outputs of the transmission signal generator.

6. A device according to claim 1, wherein the first variable delay means comprises:
an plurality of variable delay lines each having an input and an output, the input of each being connected to a respective input of the echo signal processing circuit,
an plurality of fixed delay lines which are adapted to be connected in series with each other and which each have a plurality of tappings as inputs, and
a multiplexer system by means of which the outputs of the variable delay lines can be selectively connected to input tappings of the fixed delay lines.

7. A device according to claim 1, wherein finely quantized delays of the transmission signals and of the echo signals can be carried out by means of the second variable delay means.

* * * * *